United States Patent
Kaminski et al.

(10) Patent No.: US 7,630,347 B2
(45) Date of Patent: Dec. 8, 2009

(54) HYBRID UMTS/WLAN TELECOMMUNICATION SYSTEM

(75) Inventors: Stephen Kaminski, Eislingen (DE); Hajo Bakker, Eberdingen (DE); Klaus Keil, Esslingen (DE); Manfred Litzenburger, Bruchsal (DE)

(73) Assignee: Alcatel, Paris (FR)

( * ) Notice: Subject to any disclaimer, the term of this patent is extended or adjusted under 35 U.S.C. 154(b) by 1036 days.

(21) Appl. No.: 10/663,771

(22) Filed: Sep. 17, 2003

(65) Prior Publication Data

US 2004/0076179 A1   Apr. 22, 2004

(30) Foreign Application Priority Data

Oct. 17, 2002   (EP) ................... 02360285

(51) Int. Cl.
*H04Q 7/24* (2006.01)
*H04B 7/212* (2006.01)

(52) U.S. Cl. ............... 370/338; 370/348; 455/436; 455/438; 455/450; 455/453

(58) Field of Classification Search ........... 370/401, 370/338, 349, 336, 347, 410, 465, 467, 469, 370/310.2, 348
See application file for complete search history.

(56) References Cited

U.S. PATENT DOCUMENTS 6,385,449 B2 *   5/2002   Eriksson et al. ............. 455/436

| 2001/0012778 | A1  | 8/2001 | Eriksson et al. |
| 2002/0136226 | A1  | 9/2002 | Christoffel et al. |
| 2003/0076803 | A1* | 4/2003 | Chuah ........................ 370/338 |
| 2003/0114158 | A1* | 6/2003 | Soderbacka et al. ......... 455/436 |
| 2004/0001468 | A1* | 1/2004 | Bichot et al. ................ 370/338 |

FOREIGN PATENT DOCUMENTS

WO    WO 01/99466 A2   12/2001
WO    WO 02/41587 A2    5/2002

OTHER PUBLICATIONS

"Broadband Radio Access Networks (BRAN); Hiperlan Type 2; Requirements and Architectures for Interworking Between Hiperlan/2 and 3$^{rd}$ Generation Cellular Systems", ETSI TR 101 957 V.1.1.1, Aug. 2001, pp. 1-56, XP002234986.
UMTS-WLAN "Competing or Complementary Technologies?", pp. 1-16, Oct. 24, 2001.

* cited by examiner

*Primary Examiner*—Seema S. Rao
*Assistant Examiner*—Wanda Z Russell
(74) *Attorney, Agent, or Firm*—Sughrue Mion, PLLC

(57) ABSTRACT

The present invention relates to an interface unit comprising a first component for establishing a connection to a radio network controller of a radio network sub-system by means of a first communication protocol, a second component for establishing a connection to at least one access point of a wireless local area network by means of a second communication protocol, a third component for converting the second communication protocol to the first communication protocol and for converting the first communication protocol to the second communication protocol and a fourth component for providing data indicative of a load situation of at least one access point to the radio network controller.

20 Claims, 4 Drawing Sheets

HYBRID UMTS/WLAN TELECOMMUNICATION SYSTEM

FIELD OF THE INVENTION

The present invention relates to the field of telecommunication systems, and more particularly without limitation, to hybrid UMTS/WLAN-type systems. The invention is based on a priority application EP 02 360 285.7 which is hereby incorporated by reference.

BACKGROUND AND PRIOR ART

Seamless access to modern office tools is one of the most valuable assets for mobile business professionals today. Most corporate information systems and databases can be accessed remotely through the Internet (IP) backbone, but the high bandwidth demand of typical office applications, such as large e-mail attachment downloading, often exceeds the transmission capacity of cellular networks. Mobile professionals are looking for a public wireless access solution that could cover the demand for data-intensive applications and enable smooth online access to corporate data services. Wireless standards, such as IEEE 802.11 and Blue Tooth (BT) are designed to enable mobile devices, such as mobile telephones, laptop computers and personal digital assistants (PDAs) to communicate with each other and a wired Local Area Network (LAN).

Such mobile devices are capable of moving between wireless LANs (WLANs), and some mobile devices can roam between different types of wireless networks (e.g., a WLAN and a cellular mobile telecommunications network). Such transfers typically require establishing a new connection with the new WLAN for the mobile device making the transfer.

These technologies provide for a common attachment approach for different devices, and so enables mobile phones, laptops, and PDAs to be easily networked in the office and in public locations. The IEEE 802.11 (Institute of Electrical & Electronics Engineers) and ETSI (European Telecommunications Standards Institute) HIPERLAN/2, provide a wireless connection function and may be used to support WLAN (wireless LAN) communications.

The IEEE 802.11 Wireless LAN standard focuses on access points on the same subnet. If a mobile device decides to associate itself with a new access point on the same subnet then it uses a series of Associate and Disassociate commands defined within the IEEE 802.11 specification to signal its move from the old to the new access point. If a mobile device transfers to a new subnet, a new secure (WEP) session is typically established between the mobile device and the new access point with a new encryption link.

Some mobile devices also have the capability of moving among different types of wireless communication networks, such as between a WLAN network (Bluetooth or IEEE 802.11, as described above) and a mobile telecommunications network, such as one based on a mobile telephone communication protocol (e.g., CMTS or cellular mobile telephone system, GSM or Global System for Mobile communications, PCS or Personal Communications Services, or UMTS or Universal Mobile Telecommunications System). For example, the mobile device (e.g., laptop computer or PDA) includes communications interfaces (e.g., communications hardware and software) that allow the mobile device to communicate with two (or more) different types of wireless networks. Typically, when the mobile device moves to access a different type of wireless network, the current communication session with the current wireless network terminates, and the mobile device establishes a new communication session (new communication) with the newly accessed wireless network.

To be truly effective, mobile users must be able to move their mobile devices freely from location to location. For example, users must be able to move their mobile devices from the office to their own conference room to the airport lounge to their client's conference room, while maintaining access to the some set of resources without manually registering anew in each location. They should also be able to send and receive messages and voice calls, wherever they are located. Connection servers, such as routers, WLAN gateways, and security servers, should be able to handle a mobile device that moves its connection to the network from access point to access point, from public to private networks, or from one wireless network system to a different type of wireless network system.

U.S. patent application Ser. No. 20020136226 shows a system for enabling seamless roaming of mobile devices among wireless networks. A network gateway manages roaming of a mobile device between heterogenous network systems. The network gateway obtains an access identifier from another heterogenous network system so the mobile device can roam to the other heterogenous network system while maintaining its connection to the home network gateway for the mobile device.

Coupling of WLANs and Public Land Mobile Networks (PLMN) systems can be implemented in different ways. 3GPP defines six stages of coupling with an increasing level of interworking.

The scenarios range from Open Coupling (level 1, basically constituting two separate access systems with common billing only) over Loose Coupling (level 2 and 3, additionally common Authentication, Authorization, and Accounting (AAA) services) to Tight (level 4 and 5) and Very Tight Coupling (level 5 and 6). Several field trials currently are implementing and testing the Open and Loose approach.

Further an approach for tight coupling has been suggested wherein the access points of the WLAN are directly coupled to the SGSN of the core network by means of an interworking unit (IWU). To date the prior art is silent regarding approaches for very tight coupling.

It is therefore an object of the present invention to provide and improved interface unit/interworking unit enabling very tight coupling of 3GPP/UMTS and WLAN-type systems. Further the invention aims to provide a corresponding hybrid telecommunication system and telecommunication method.

SUMMARY OF THE INVENTION

The underlying objects of the present invention are solved basically by applying the features laid down in the respective independent claims. Preferred embodiments of the invention are given in the dependent claims.

In accordance with the present invention an interface or interworking unit (IWU) is coupled to the radio network controller (RNC) of a 3GPP/UMTS-type system.

The radio network controller (RNC) is a logical node in the radio network sub-system (RNS) which is in charge of controlling the use and the integrity of the radio resources. It is the purpose of a RNC to be connected to one or more Node Bs. A Node B is a logical node in the RNS responsible for radio transmission/reception in one or more cells to/from the user equipment.

In accordance with the present invention, an IWU is connected to the RNC instead of a Node B. From the perspective of the RNC the IWU mimics the functionality of a Node B.

From the perspective of the WLAN the IWU is coupled to one or more access points (APs). The IWU converts the communication protocols which are used for communication between Node B and RNC and which are used between the APs in order to couple the WLAN to the 3GPP/UMTS telecommunication systems. For the purpose of the radio network control functionality the IWU collects data describing the load situation of the access points of the WLAN. This load situation is reported from the IWU to the RNC.

In accordance with a preferred embodiment of the invention, the IWU converts transportation of user data and control data via ATM or IP to transportation via Ethernet and vice versa. For example, the IWU is connected by a short distance Ethernet bus to a plurality of APs of the WLAN. On the other side the IWU is connected to the RNC via a long distance ATM connection.

In accordance with a further preferred embodiment of the invention the physical cells within the WLAN constituted by the APs are grouped into logical cells, where each logical cell can comprise a number of physical cells.

It is preferred that the IWU handles the load balancing of the APs within a logical cell locally without involving the RNC. In this instance the IWU only reports data being descriptive of the load situation with respect to the logical cells but not with respect to individual physical cells. In accordance with a further preferred embodiment of the invention the RNC handles handover control between the logical cells of the WLAN but not between the physical cells within the logical cells. This is analogous to the handling of handovers between the cells of a 3GPP/UMTS network.

BRIEF DESCRIPTION OF THE DRAWINGS

In the following preferred embodiments of the invention will be described in greater detail by making reference to the drawings in which.

DETAILED DESCRIPTION OF PREFERRED EMBODIMENTS

Figure 1:
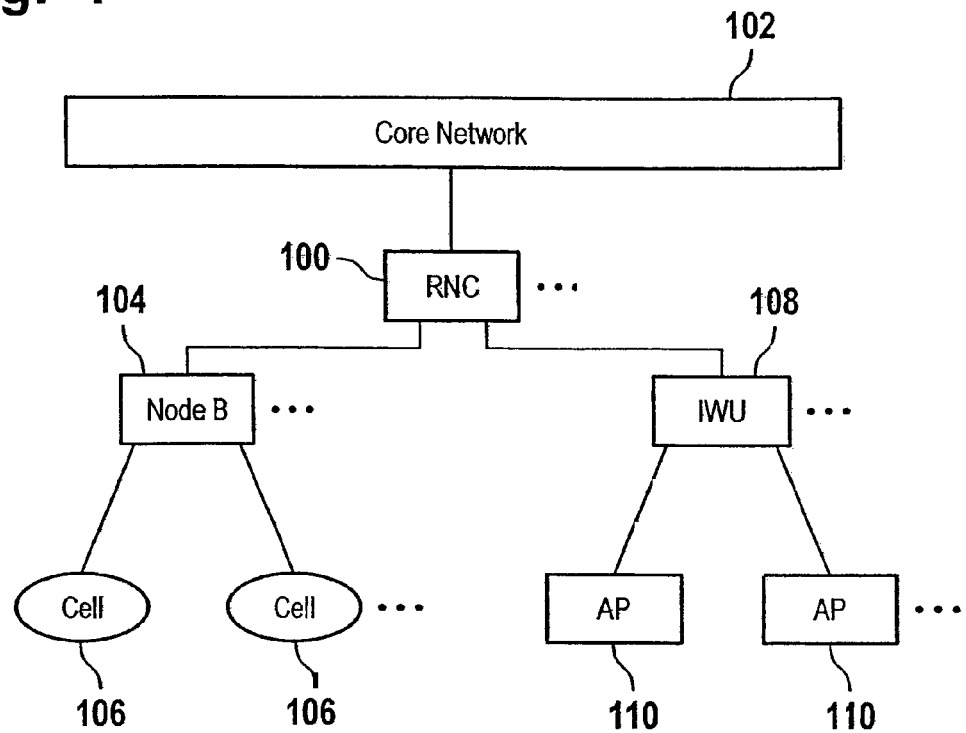
FIG. 1 is a block diagram of a preferred embodiment of a hybrid telecommunication system of the invention.

FIG. 1 shows a block diagram of a hybrid telecommunication system. One or more RNCs 100 are coupled to core network 102.

A number of Node Bs 104 is coupled to RNC 100. Each of the Node Bs 104 provides one or more cells 106. This way a 3GPP/UMTS-type telecommunication system is provided.

Further, an interface or interworking unit (IWU) 108 is coupled to RNC 100. From the perspective of RNC 100 IWU 108 mimics a Node B. Further, IWU 108 is coupled to access points (APs) 110 of a Wireless Local Area Network (WLAN). Preferably the WLAN is a HIPERLAN type 2 as specified in ETSI; HIPERLAN Type 2; Data Link Control (DLC) Layer; Part 2: Radio Link Control (RLC) sublayer; TS 101 761-2 V1.3.1 (2002-01), the entirety of which is herein incorporated by reference, or an IEEE 802.11 WLAN system.

The IWU 108 collects load information from the access points 110 and provides the load information to the RNC 100. This enables the RNC 100 to provide radio network control functionality with respect to the WLAN in the same or a similar manner like for the cells 106 of the 3GPP/UMTS telecommunication system.

Figure 2:
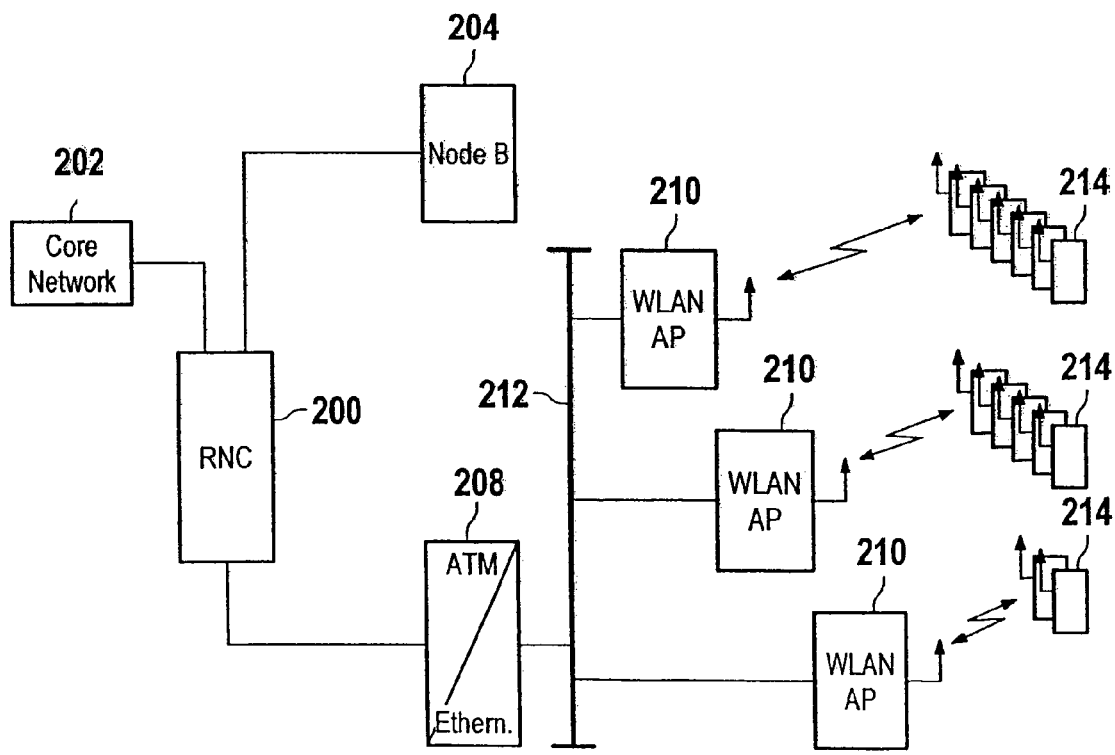
FIG. 2 is a block diagram of a more detailed second embodiment of a hybrid telecommunication system of the invention.

FIG. 2 shows a more detailed block diagram of a preferred embodiment. In this embodiment RNC 200 is connected to core network 202 and to one or more Node Bs 204. Further RNC 200 is connected to one or more IWUs 208. The link between RNC 200 and Node B 204 is a long distance connection, such as e.g. an ATM or IP link. Likewise the connection between the RNC 200 and IWU 208 is of the same ATM or IP long distance type.

IWU 208 is connected to APs 210 of the WLAN by means of bus 212. Preferably bus 212 is an Ethernet bus. Each of the APs 210 communicates with one or more wireless terminals (WT) 214.

For coupling of the WLAN to the 3GPP/UMTS telecommunication systems the IWU 208 has a converter functionality between the ATM and the Ethernet transport layers. This way the IWU 208 can communicate with the APs 210 and with the RNC 200. By converting the messages from the WLAN protocol stack (transported via, e.g., Ethernet) to/from the APs 210 into messages from the UMTS protocol stack (transported via, e.g., ATM or IP) to/from the RNC the IWU 208 mimics a Node B 204 to the RNC 200.

To enable a seamless handover in the case of a UMTS-to-WLAN or WLAN-to-UMTS transition of a WT 214 all WLAN data and control information should be mapped to UMTS logical channels. The required protocol stacks can be based on the approach to use the IP layer provided by the WLAN network to transport UMTS MAC-d and MAC-c/sh PDUs. Based on this approach, each WLAN system offering the possibility to transport IP traffic can be used for this Very Tight Coupling approach.

Figure 3:
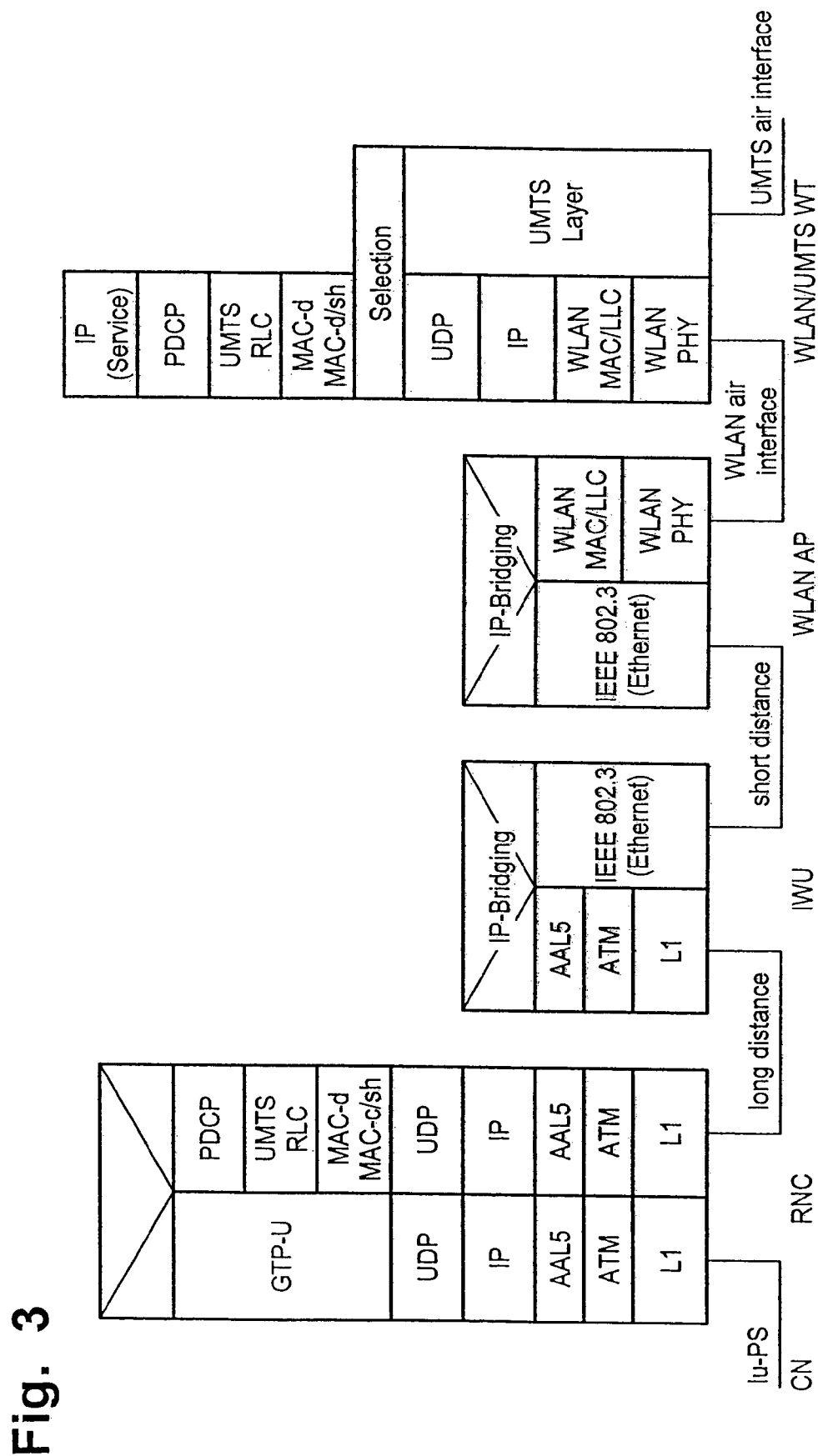
FIG. 3 is illustrative of a user plane protocol stack for very tight coupling.

A protocol stack for the user plane is depicted in FIG. 3 for the case of a dual mode UMTS/WLAN WT by way of example. For details of the individual UMTS protocol entities reference is made to 3GPP (TSG RAN), TS 25.401 V3.8.0: "UTRAN Overall Description (Release 99)", September 2001. Above the UDP layer the normal UMTS stack is applied, i.e., the architecture is completely transparent, the IP-tunnelling mechanism (PDCP, GTP-U) between the terminal and the CN is not affected.

Figure 4:
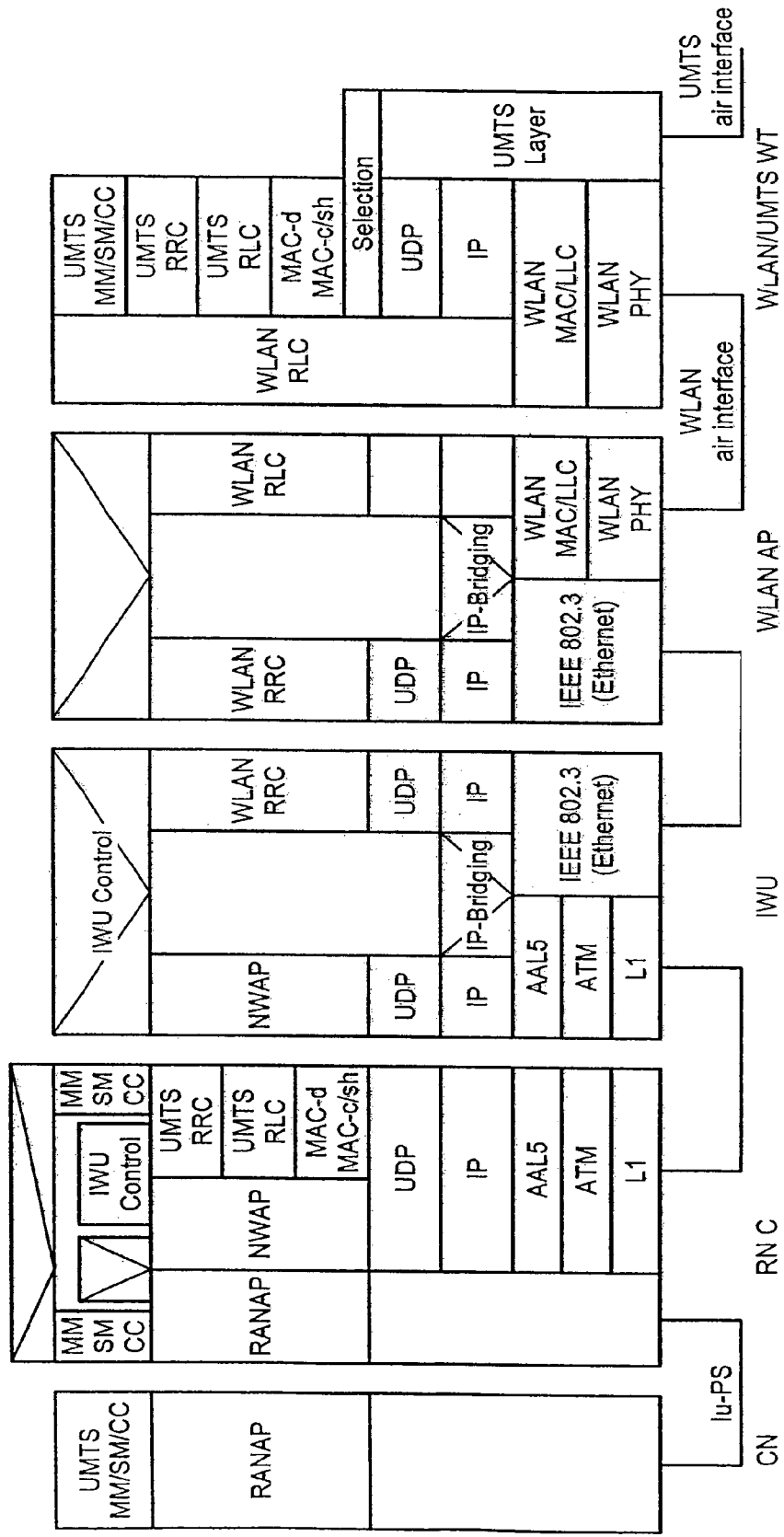
FIG. 4 is illustrative of a control plane protocol stack for very tight coupling.

For a dual mode terminal equipped with a WLAN and a UMTS air interface both protocol stacks below the MAC-d layer are shown in FIG. 3 and FIG. 4. The WLAN air interface is used as an equivalent alternative of the UMTS air interface. The choice of either type is done within the depicted selection entity, whereas the control of the selection entity is done by the UMTS RRC and/or UMTS MM. There may also be WTs only equipped with a WLAN air interface; in this case the selection entity and the UMTS air interface specific layers below shall be omitted. The frame protocol (FP) between the RNC and the Node B, which in UMTS is necessary for the multiplexing of the MAC PDU is removed. Instead the individual IP connections between the RNC and the IWU are used for this functionality. The corresponding control plane for the "intelligent IWU" approach is depicted in FIG. 4.

The generation and the analysis of the load report between the IWU and RNC is processed within the 'IWU Control' layer. The NWAP protocol (Node-W Application Part, an extended UMTS NBAP protocol) can be used as a transport function as illustrated in FIG. 4. The load report represents the total load of the overall 'WLAN-UMTS radio cell', but there is still the possibility that the traffic inside a 'WLAN-UMTS radio cell' is not distributed homogeneously, e.g., a huge number of WLAN WTs communicate via one AP while other APs serve only a few WTs. In this case the IWU has to distribute the load by means of a forced handover within the 'WLAN-UMTS radio cell'.

This function is included in the WLAN RRC layer. The IWU also supports the handling of the complementary handover strategies of UMTS and WLAN systems: Within UMTS the handover is controlled by the RNC for all CS and PS services transported in the DCHs. In contrast, the handover decision algorithm in WLAN terminals is completely independent from the WLAN AP, i.e. the AP is not involved, a WLAN terminal contacts without any control of the WLAN network the selected new AP. To resolve this situation the following concept is suggested as a preferred embodiment:

The RNC shall not have any control with respect to handover inside a "WLAN-UMTS radio cell", i.e. horizontal handover.

If a WLAN terminal moves from one "UMTS-WLAN radio cell" to another controlled by the same or another IWU the RNC is involved.

Each vertical handover is controlled by the RNC, i.e., the RNC informs the IWU that a dual mode terminal will leave or enter the 'UMTS-WLAN radio cell'.

Figure 5:
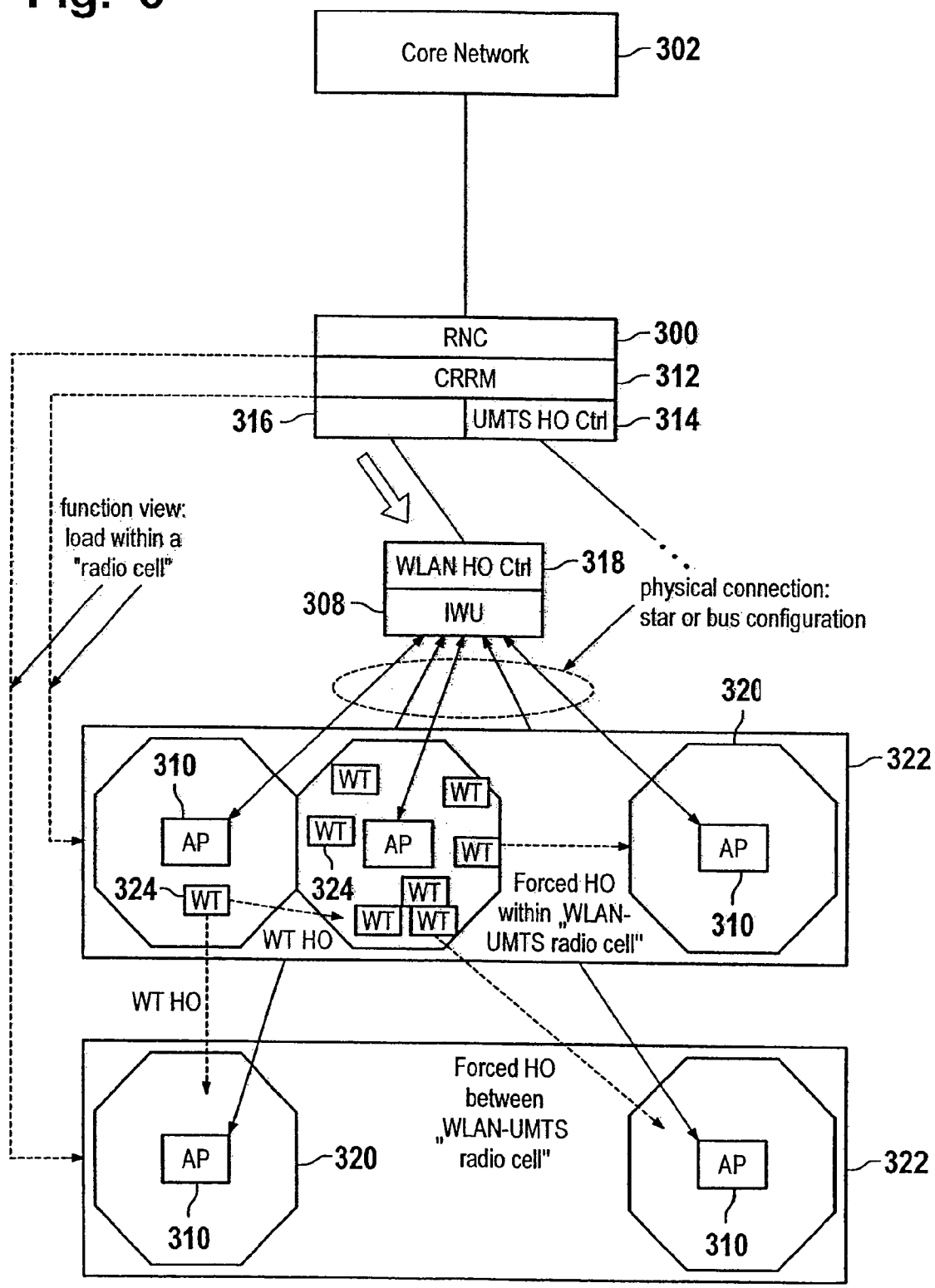
FIG. 5 shows a block diagram of a further preferred embodiment of a hybrid telecommunication system of the invention.

FIG. 5 shows a block diagram of further preferred embodiment. The telecommunication system of FIG. 5 has a core network 302 to which one or more RNCs 300 are connected. RNC 300 has common radio resource management (CRRM) 312, UMTS handover control 314 and WLAN handover control 316. It is to be noted that WLAN handover control 316 is an optional component for RNC 300, especially for WLANs which do not allow handovers which are initiated by the wireless terminal (WT).

RNC 300 is connected at least to interworking unit (IWU) 308 which has a WLAN handover control 318. Further IWUs 308 can be connected to the RNC 300 as well as one or more Node Bs.

WLAN has a number of APs 310. Each of the APs 310 is connected to IWU 308 by a bus connection, such as an Ethernet bus connection. Each of the APs 310 covers a certain geographical region which defines the boundaries of a physical cell 320. A plurality of neighbouring physical cells 320 constitutes a logical cell 322. Preferably the logical cells 322 appear as the smallest level of granularity from the perspective of the RNC 300.

The common radio resource management (CRRM) 312 requires that a load report from each of the logical cells 322 is provided to the RNC 300. The generation of this load report is based on a two step approach:

The IWU 308 gathers information from each AP 310, summarizes these individual reports and transfers the result to the CRRM 312 in the RNC 300. Preferably the following information is included in the report:

Topology/configuration changes (e.g., "on the fly" installation or removal of APs 310 from the WLAN), impact on resources of terminal handovers between the logical cells 322, changes of radio conditions and resulting changes of available resources. For this purpose an extended NBAP protocol, i.e. the NWAP protocol is used to transmit this information, while the IWU 308 control is responsible for the processing of the information.

In other words, the IWU 308 collects data from the APs 310 concerning the load condition of each individual AP 310. Based on this information the IWU 308 determines the overall load situation for each one of the logical cells 322. The overall load situation expresses the total load of the APs 310 within the cell 322 as a fraction of the integrated capacities of all physical cells 320 within that logical cell 322. Data descriptive of this overall load situation of each one of the logical cells 322 is provided from the interworking unit (IWU) 308 to the CRRM 312 within RNC 300 for the purpose of management of the radio resources.

As the overall load report which is provided from the IWU 308 to the CRRM 312 describes the total load within a logical cell 322, there is the possibility that the traffic inside the logical cell 322 is not distributed homogeneously. For example, such a situation occurs when the majority of the WTs 324 within logical cell 322 is concentrated within one of the physical cells 320 of logical cell 322 while other physical cells 320 of the same logical cell 322 have no or few WTs 324.

In such a situation IWU 308 can redistribute the load within the logical cell 322 by means of its WLAN handover control 318. By issuing appropriate control signals forced handovers of WTs 324 within the physical cell 320 of logical cell 322 which is densely populated are initiated in order to free capacity of the densely populated physical cell 320. Such a forced handover within a logical cell 322 is illustrated in the upper logical cell 322 of FIG. 5.

It is to be noted that such a forced handover within the logical cell 322 is entirely handled on the level of IWU 308 without involving the RNC 300. However, if a WLAN is used which does not allow the individual WTs 324 to initiate handovers, the handover control can also be handled on the level of RNC 300, and more specifically by WLAN handover control 316.

If a WT 324 moves from one logical cell 322 to another logical cell 322 the handover is controlled by the RNC 300 rather than by the IWU 308 as this situation is analogous to a handover which occurs in the UMTS network when a user equipment (UE) is moved from one cell to another cell.

In summary handover situations are preferably handled as follows:

Handover between a logical cell 322 of the WLAN and a cell of the UMTS network: Such a handover situation is controlled by the RNC 300. The IWU 308 is informed that a WT 324 leaves or enters a logical cell 322.

Forced handover between logical cells 322 of WLAN: This is handled by the RNC 300.

Forced handover between physical cells 320 within the same logical cell 322: This is initiated and controlled by the APs 310 within the logical cell 322 and/or by the IWU 308, and particularly by WLAN handover control 318.

Handover based on WLAN principle (initiated by WT 324): The new AP 310 of the WT 324 has to inform the IWU 308 about the new WT 324. In response the IWU 308 has to send an updated load report to the RNC 300.

| List of Reference Numerals | |
|---|---|
| 100 | radio network controller (RNC) |
| 102 | core network |
| 104 | Node B |
| 106 | cell |
| 108 | interworking unit (IWU) |
| 110 | access point (AP) |
| 200 | radio network controller (RNC) |
| 202 | core network |
| 204 | Node B |
| 208 | interworking unit (IWU) |
| 210 | access point (AP) |
| 212 | bus |
| 214 | wireless terminal (WT) |
| 300 | radio network controller (RNC) |

-continued

List of Reference Numerals

| | |
|---|---|
| 302 | core network |
| 308 | interworking unit (IWU) |
| 310 | access point (AP) |
| 312 | common radio resource management (CRRM) |
| 314 | UMTS handover control |
| 316 | WLAN handover control |
| 318 | WLAN handover control |
| 320 | physical cell |
| 322 | logical cell |
| 324 | wireless terminal (WT) |

The invention claimed is:

1. An interface unit comprising:
a first component for establishing a connection to a radio network controller of a radio network sub-system by means of a first communication protocol;
a second component for establishing a connection to a plurality of access points of a wireless local area network by means of a second communication protocol, wherein each of the plurality of access points covers a respective physical cell, and a plurality of physical cells including the respective physical cell constitutes a logical cell;
a third component for converting the second communication protocol to the first communication protocol and for converting the first communication protocol to the second communication protocol; and
a fourth component for providing data indicative of a load situation of the logical cell to the radio network controller, wherein the load situation indicates a total load of the plurality of access points within the logical cell as a fraction of an integrated capacity of the plurality of physical cells within the logical cell, wherein the radio network controller is configured to control a handover between logical cells based on said data indicative of the load situation of the logical cell.

2. The interface unit of claim 1, the connection to the radio network controller being a long distance connection comprising at least one of an Asynchronous Transfer Mode (ATM)-type connection and an Internet protocol (IP)-type connection.

3. The interface unit of claim 1, the connection to the at least one access point being a short distance connection comprising an Ethernet-type connection.

4. The interface unit of claim 1 further comprising a fifth component for balancing the total load of the plurality of the access points.

5. The interface unit of claim 1 further comprising a sixth component for hand over control of wireless terminals between the plurality of access points.

6. The interface unit of claim 1, wherein the radio network controller controls hand over between the logical cells, and the radio network controller does not control hand over between the plurality of physical cells.

7. A telecommunication system comprising:
a radio network controller for coupling to a core network and for coupling to one or more Node Bs of a Universal Mobile Telecommunications System (UMTS) network,
a wireless local area network having a plurality of access points,
an interface unit for coupling the plurality of access points to the radio network controller, the interface unit having a component for providing data indicative of a load situation of a logical cell to the radio network controller, wherein the radio network controller is configured to control a handover between logical cells based on said data indicative of the load situation of the logical cell,
wherein each of the plurality of access points covers a respective physical cell, and a plurality of physical cells including the respective physical cell constitutes the logical cell, and
wherein the load situation indicates a total load of the plurality of access points within the logical cell as a fraction of an integrated capacity of the plurality of physical cells within the logical cell.

8. The telecommunication system of claim 7 further comprising a component for balancing the total load of the plurality of access points, the component for load balancing being comprised in the interface unit.

9. The telecommunication system of claim 7 further comprising a component for hand over control of wireless terminals between the plurality of access points.

10. The telecommunication system of claim 9, the component for hand over control being comprised in the radio network controller.

11. The telecommunication system of claim 7, wherein the radio network controller controls hand over between the logical cells, and the radio network controller does not control hand over between the plurality of physical cells.

12. A telecommunication method comprising:
providing of a third Generation Partnership Project/Universal Mobile Telecommunications System (3GPP/UMTS)-type system having one or more radio network controllers, wherein the radio network controller is configured to control a handover between logical cells based on said data indicative of the load situation of the logical cell,
providing of a wireless local area network-type system having a plurality of access points,
coupling of the wireless local area network-type system to the 3GPP UMTS-type system by interconnecting the at least one radio network controller and the plurality of access points by means of the interface unit as claimed in claim 1.

13. The telecommunication method of claim 12, wherein the radio network controller controls hand over between the logical cells, and the radio network controller does not control hand over between the plurality of physical cells.

14. An interface unit comprising:
a first component for establishing a first connection to a radio network controller (RNC) of a radio network sub-system by means of a first communication protocol used in a first network, the first connection being established not by way of any node served in the first network and coupled to the RNC;
a second component for establishing a second connection to a plurality of access points of a wireless local area network by means of a second communication protocol used in a second network, wherein each of the plurality of access points covers a respective physical cell, and a plurality of physical cells including the respective physical cell constitutes a logical cell;
a third component for converting the second communication protocol to the first communication protocol and for converting the first communication protocol to the second communication protocol; and
a fourth component for providing data indicative of a load situation of the logical cell to the radio network controller, wherein the radio network controller is configured to control a handover between logical cells based on said data indicative of the load situation of the logical cell.

15. The interface unit of claim 14,
wherein the first network is a Universal Mobile Telecommunications System (UMTS) network and the second network is a wireless local area network (WLAN), and
wherein the any node coupled to the RNC is a Node B to which mobile terminals located in the UMTS network are coupled.

16. The interface unit of claim 15, wherein the first and the second connections are an Asynchronous Transfer Mode (ATM) or an Internet Protocol (IP) connection.

17. A telecommunication method comprising:
providing of a third Generation Partnership Project/Universal Mobile Telecommunications System (3GPP/UMTS)-type system having one or more radio network controllers, wherein the radio network controller is configured to control a handover between logical cells based on said data indicative of the load situation of the logical cell,
providing of a wireless local area network-type system having a plurality of access points,
coupling of the wireless local area network-type system to the 3GPP UMTS-type system by interconnecting the at least one radio network controller and the plurality of access points by means of the interface unit as claimed in claim 14.

18. A telecommunication system comprising:
a radio network controller (RNC) for coupling to a core network and for coupling to one or more Node Bs coupled to mobile terminals located in a Universal Mobile Telecommunications System (UMTS) network using a first communication protocol,
a wireless local area network (WLAN) having a plurality of access points coupled to an interface unit using a second communication protocol,
the interface unit for coupling the plurality of access points directly to the RNC not by way of any node served in the first network and coupled to the RNC, the interface unit having a component for providing data indicative of a load situation of a logical cell to the radio network controller, wherein the radio network controller is configured to control a handover between logical cells based on said data indicative of the load situation of the logical cell,
wherein each of the plurality of access points covers a respective physical cell, and a plurality of physical cells including the respective physical cell constitutes the logical cell.

19. The telecommunication system of claim 18, wherein the any node coupled to the RNC is a Node B to which mobile terminals located in the UMTS network are coupled.

20. The telecommunication system of claim 19, wherein the first and the second connections are an Asynchronous Transfer Mode (ATM) or an Internet Protocol (IP) connection.

* * * * *

UNITED STATES PATENT AND TRADEMARK OFFICE
CERTIFICATE OF CORRECTION

PATENT NO. : 7,630,347 B2
APPLICATION NO. : 10/663771
DATED : December 8, 2009
INVENTOR(S) : Kaminski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1255 days.

Signed and Sealed this

Twenty-first Day of December, 2010

David J. Kappos
*Director of the United States Patent and Trademark Office*